(12) United States Patent
Takaishi et al.

(10) Patent No.: US 11,353,415 B2
(45) Date of Patent: Jun. 7, 2022

(54) THERMAL ANALYSIS DEVICE, SAMPLE HOLDER ASSEMBLY AND THERMAL ANALYSIS METHOD

(71) Applicant: Netzsch-Gerätebau GmbH, Selb (DE)

(72) Inventors: Hiroki Takaishi, Kanagawa (JP); Daisuke Ito, Tokyo (JP); Kenta Sato, Kanagawa (JP)

(73) Assignee: NETZSCH-Gerätebau GmbH, Selb (DE)

( * ) Notice: Subject to any disclaimer, the term of this patent is extended or adjusted under 35 U.S.C. 154(b) by 0 days.

(21) Appl. No.: 17/029,919

(22) Filed: Sep. 23, 2020

(65) Prior Publication Data
US 2021/0088460 A1 Mar. 25, 2021

(30) Foreign Application Priority Data
Sep. 25, 2019 (JP) .............................. JP2019-174562

(51) Int. Cl.
*G01N 5/00* (2006.01)
*G01N 25/00* (2006.01)
*G01K 7/00* (2006.01)
*G01K 1/00* (2006.01)
(Continued)

(52) U.S. Cl.
CPC .............. *G01N 25/20* (2013.01); *G01N 5/04* (2013.01)

(58) Field of Classification Search
USPC .............................. 374/12, 166, 14, 179, 208
See application file for complete search history.

(56) References Cited

U.S. PATENT DOCUMENTS

| | | | |
|---|---|---|---|
| 6,390,669 B1* | 5/2002 | Nakamura | G01N 25/4866 374/10 |
| 2003/0072348 A1* | 4/2003 | Danley | G01N 25/4833 374/31 |

(Continued)

FOREIGN PATENT DOCUMENTS

| | | |
|---|---|---|
| EP | 405153 A1 | 1/1991 |
| JP | 3127043 B2 | 1/2001 |

(Continued)

*Primary Examiner* — Mirellys Jagan
(74) *Attorney, Agent, or Firm* — Whitmyer IP Group LLC

(57) ABSTRACT

A thermal analysis device, a sample holder assembly and a thermal analysis method, capable of DSC measurement and TG measurement while simplifying replacement of a temperature sensor or the like upon damages. The thermal analysis device includes a sample holder assembly that is detachably mounted, a first sample stage and a second sample stage that are detachably mounted, a heater (heating furnace) that heats the sample holder assembly and the like, a temperature controller, a temperature measuring section for detecting a temperature difference between the sample and a reference substance, and a weight measuring section (balance) for measuring a weight difference between the sample and the reference substance. The sample holder assembly includes a first sample holder for placing a sample thereon, and a second sample holder for placing a reference substance thereon, as well as a heat sink coupled to the first sample holder and the second sample holder, respectively, through a member having a predetermined thermal resistance, for measuring the temperature difference or the weight difference.

15 Claims, 10 Drawing Sheets

(51) Int. Cl.
*G01N 25/20* (2006.01)
*G01N 5/04* (2006.01)

(56) References Cited

U.S. PATENT DOCUMENTS

| | | | | |
|---|---|---|---|---|
| 2016/0047700 A1* | 2/2016 | Danley | ............... | G01K 17/00 374/12 |
| 2016/0054181 A1* | 2/2016 | Shinoda | ............ | G01N 25/4833 374/142 |
| 2021/0055194 A1* | 2/2021 | Takashima | ............... | G01N 5/04 |

FOREIGN PATENT DOCUMENTS

| | | | |
|---|---|---|---|
| JP | 3241427 | B2 | 12/2001 |
| JP | 5933653 | B2 | 6/2016 |

* cited by examiner

Prior Art

THERMAL ANALYSIS DEVICE, SAMPLE HOLDER ASSEMBLY AND THERMAL ANALYSIS METHOD

TECHNICAL FIELD

The present disclosure relates to a device for analyzing weight change of a substance and generated and absorbed heat thereof with respect to temperature change, a sample holder assembly and a thermal analysis method.

BACKGROUND

Techniques are under development in which while changing the temperature of a sample, the weight change and the quantity of generated and absorbed heat are quantified thereby analyzing a thermal decomposition reaction of the sample. Of those, thermogravimetry (hereinafter referred to as "TG") is a technique that is generally used for evaluating the heat resistance property of a sample and analyzing a heat decomposition reaction thereof, in which while the temperature of the sample is changed, the change in the weight of the sample is measured. This measurement can be performed using a thermogravimeter. Further, differential scanning calorimetry (hereinafter referred to as "DSC") is a technique for capturing the change in the temperature and the enthalpy caused by melting and phase transition of a sample (heat of fusion, heat of transition) and the like, thereby quantifying the temperature of reactions such as glass transition and hardening reaction, the heat of reaction and the like. The DSC can be performed using a differential scanning calorimeter.

Similar techniques to the DSC includes differential thermal analysis (hereinafter referred to as "DTA") in which while the temperature of a sample is changed, the relative temperature change of a sample caused by phase transition, reactions, and the like with respect to a reference substance is measured. In DSC, a heat sink is provided in terms of the device structure, and the generated and absorbed heat can be quantified by measuring the amount of heat moving between the sample and the heat sink. To the contrary, in DTA, although the transition temperature and the like of the sample can be measured, it is assumed to be difficult in terms of the structure, to measure generated and absorbed heat such as heat of transition.

Here, the principle of DSC will be described with reference to FIG. 11. FIG. 11 is a diagram showing the structure of a typical differential scanning calorimeter. A sample container loaded with a sample and a sample container loaded with a reference substance are fixed to a heat sink through coupling members having a predetermined thermal resistance. The sample and the reference substance are placed inside a furnace provided with a heating coil, and the temperature inside the furnace is controlled using a controller not shown. A differential thermocouple is provided to measure the temperature difference $\Delta T$ between the temperature $T_S$ of the sample and the temperature $T_R$ of the reference substance; the $\Delta T$ is calculated by dividing the voltage $V_{SR}$ at both ends of the differential thermocouple by the Seebeck coefficient inherent to the material of the thermocouple.

Provided that the temperature of the heat sink is $T_H$, the heat flow $dq_S/dt$, that is, the quantity of heat flowing from the heat sink to the sample per unit time is expressed by Equation (1).

[Equation 1]

$$\frac{dq_S}{dt} = \frac{1}{R}(T_H - T_S) \quad (1)$$

where R is a thermal resistance between the sample and the heat sink.

Similarly, the heat flow $dq_R/dt$ from the heat sink to the reference substance is expressed by Equation (2).

[Equation 2]

$$\frac{dq_R}{dt} = \frac{1}{R}(T_H - T_R) \quad (2)$$

Accordingly, the relationship between $\Delta T$ and the difference $d\Delta q/dt$ between the heat flow from the heat sink to the reference substance and the heat flow from the heat sink to the sample can be expressed by Equation (3), in which Equation (2) is subtracted from Equation (1).

[Equation 3]

$$\frac{d\Delta q}{dt} = \frac{dq_S}{dt} - \frac{dq_R}{dt} = \frac{1}{R}(T_R - T_S) = -\frac{1}{R}\Delta T \quad (3)$$

FIGS. 12A and 12B show the result of DSC during an endothermic reaction of the sample. The rise of the sample temperature $T_s$ is retarded during a period between the times $t_1$ and $t_2$ as shown in FIG. 12A. As shown in FIG. 12B, a peak of the difference $\Delta T_P$ between the temperatures of the sample and the reference substance is observed in the same period. Note that the peak $\Delta T_P$ here is the difference between the temperature difference prior to the start of the endothermic reaction and the temperature at a time when the absorbed heat flow is maximized. Both sides of Equation (3) are integrated with respect to the period between the times $t_1$ and $t_2$ to obtain the following Equation (4).

[Equation 4]

$$\int_{t_1}^{t_2} \frac{d\Delta q}{dt} \cdot dt = -\frac{1}{R}\int_{t_1}^{t_2} \Delta T \cdot dt \quad (4)$$

The left side of Equation (4) is the amount of heat Q absorbed by the sample during the period between times $t_1$ and $t_2$, whereas $$\int_{t_1}^{t_2} \Delta T \cdot dt$$

on the right side is the area corresponding to the peak portion hatched in FIG. 12B. Accordingly, the area of the peak portion is in proportion to the amount of heat Q absorbed by the sample.

Note that the coefficient R in Equation (3) that is used for determining the heat flow $d\Delta q/dt$ absorbed by the sample from the temperature difference $\Delta T$ can be calculated for example from the relationship between the area of the peak portion of the temperature difference $\Delta T$ obtained by performing a DSC measurement on a material which absorbs a known amount Q by melting and the amount of absorbed heat Q.

On the other hand, DTA does not involve a structure corresponding to the heat sink in DSC. Accordingly, although the transition temperature can be found from the peak of the absorbed heat, the temperature difference $\Delta T$ cannot be converted into the amount of absorbed heat Q.

In recent years, devices for simultaneously performing measurements using TG and DSC or DTA that have been described above. For example, such an analysis, in which while weight change resulted from solvent evaporation from a sample or thermal decomposition is captured by TG, and the resultant endothermic/exothermic phenomenon is captured by DSC or DTA at the same time has become possible. These analyses and relevant devices are referred to as TG-DSC or TG-DTA. Such an analysis is also referred to as simultaneous thermal analysis (STA).

A typical structure of a TG-DSC is disclosed, for example, in EP 0405153 B1 (PTL 1). A device for thermal analysis disclosed in PTL 1 has sample holders capable of carrying a sample and a reference substance, which holders are provided on the tip of one supporting rod extending upward from a balance mechanism. The sample holders include a sample container for carrying a sample and a sample container for carrying a reference substance on a heat sink. Accordingly, a structure of DSC is employed in which the difference between the heat flow from a heat sink to a sample and the heat flow from the heat sink to a reference substance is detected.

As an improved TG-DSC, JP 5933653 B2 (PTL 2) discloses a thermal analysis device in which the sample side and the reference substance side are mechanistically separated for ensuring that the measured value of the weight is not affected by the buoyancy and convection flows or the like when the temperature is changed, and which is provided with a heat sink that allows measurement of the difference of the heat flow between the sample and the reference substance.

On the other hand, a typical structure of TG-DTA is disclosed, for example, in JP 3127043 B2 (PTL 3) and JP 3241427 B2 (PTL 4). Among these, PTL 3 discloses a thermogravity detector (TG-DTA) capable of measuring the weight difference and the temperature difference between a sample and a reference substance on pans placed on vertical supporting rods of an upright (vertical) differential balance. DTA can be performed by measuring the temperature difference between the sample and the reference substance; however, a heat sink for measuring the difference between the heat flow from the heat sink to the sample and the heat flow from the heat sink to the reference substance is not provided. Thus, the TG-DTA does not have a structure of DSC.

PTL 4 discloses a thermal analysis device (TG-DTA), capable of measuring the weight difference and the temperature difference between a sample and a reference substance placed on respective holders provided on the tip of two horizontally extending beams in a horizontal differential balance (TG-DTA). DTA can be performed by measuring the temperature difference between the sample and the reference substance; however, a heat sink for measuring the heat flow difference between the sample and the reference substance is not provided, a structure of DSC is not provided as with PTL 3.

PATENT LITERATURE

PTL 1: EP 0405153 B1
PTL 2: JP 5933653 B2
PTL 3: JP 3127043 B2
PTL 4: JP 3241427 B2

SUMMARY OF INVENTION

Technical Problem

In TG-DSC described in PTL 1, TG and DSC can be measured at the same time; however, it is necessary that a measurement is first performed without placing the sample and a reference substance (blank measurement), and the blank measurement data is subtracted after the sample measurement so as to cancel the effects of the buoyancy and convection flows. Besides, when boiling over of the sample takes place and the temperature sensor or the like is damaged, there may be instances where not only the sample holder and the temperature sensor, but also the beams as a whole must be replaced, thereby making the replacement works complicated increasing the cost involved.

In TG-DSC disclosed in PTL 2, while a blank measurement is not required, when boiling over of the sample takes place and the temperature sensor or the like is damaged, it must be replaced together with the beams as with PTL 1.

Further, since both TG-DTA as disclosed in PTL 3 and PTL 4 use a differential balance, the sample side and the reference substance side must be separated mechanistically. Therefore, a heat sink for measuring the heat flow difference between the sample and the reference substance cannot be provided, and it is difficult to realize a structure of DSC. Further, when boiling over of the sample takes place and the temperature sensor or the like is damaged, the damaged parts must be replaced together with the beams as with PTL 1 or PTL 2.

An object of the present disclosure made in view of those circumstances is to provide a thermal analysis device, a sample holder assembly and a thermal analysis method, capable of TG and DSC measurement while simplifying replacement works when the temperature sensor or the like is damaged.

Solution to Problem

In order to solve the problems described above, a thermal analysis device according to the present disclosure comprises:

two beams extending in the vertical direction, a sample holder assembly detachably attached to upper ends of the two beams;

a first sample stage and a second sample stage that are detachably attached to the upper ends of the two beams instead of the sample holder assembly;

a heater that heats the sample holder assembly or the first sample stage and the second sample stage;

a temperature controller that controls the temperature of the heater;

a temperature measuring section capable of detecting a temperature difference between the upper ends of the two beams;

a weight measuring section that holds the two beams and measures a weight difference between a sample on the first sample stage and a reference substance on the second sample stage;

wherein the sample holder assembly includes:

a first sample holder for placing a sample and a second sample holder for placing a reference substance; and a heat sink coupled to each of the first sample holder and the second sample holder with a member having a predetermined thermal resistance;

wherein, when the sample holder assembly is mounted on the upper ends of the two beams, the first sample holder and the second sample holder are in contact with the upper ends of the two beams, and wherein at least one of the temperature difference and the weight difference is measured while changing the temperature of the heater by the temperature controller.

In the thermal analysis device according to the present disclosure, with the constitution as described above, it is preferred that the heat sink is arranged to surround the first sample holder and the second sample holder in the plan view.

In the thermal analysis device according to the present disclosure, with the constitution as described above, it is preferred that the member having the predetermined thermal resistance comprises a radially inner arm portion extending in a radial direction outward from the first sample holder and the second sample holder, a circumferential arm portion extending in the circumferential direction and connected to an outer end portion of the radially inner arm portion, and a radially outer arm portion extending in the radial direction and connecting the circumferential arm portion with the heat sink.

In the thermal analysis device according to the present disclosure, with the constitution as described above, it is preferred that the radially outer arm portion is disposed at a circumferential position between one radial inner arm portion and another radially inner arm portion.

In the thermal analysis device according to the present disclosure, with the constitution as described above, it is preferred that the first sample holder, the second sample holder and the heat sink are fixed on a substrate having a through-hole through which the two beams pass.

In the thermal analysis device according to the present disclosure, with the constitution as described above, it is preferred that the temperature measurement section includes:

a thermocouple wire comprising a first metal connected to each of the upper ends of the two beams; and a thermocouple wire comprising a second metal connected to the upper end of one of the two beams;

wherein the member having the predetermined thermal resistance and the heat sink are members made of the second metal.

In the thermal analysis device according to the present disclosure, with the constitution as described above, it is preferred that the first metal is platinum and the second metal is a platinum rhodium alloy.

In the thermal analysis device according to the present disclosure, with the constitution as described above, it is preferred that the first metal is a platinum rhodium alloy and the second metal is platinum.

In order to solve the problems described above, a sample holder assembly according to the present disclosure comprises:

a first sample holder and a second sample holder;

a heat sink coupled to each of the first sample holder and the second sample holder with a member having a predetermined thermal resistance; and a substrate for fixing the first sample holder, the second sample holder and the heat sink;

wherein through-holes are respectively formed below the first sample holder and the second sample holder in the substrate.

In order to solve the problems described above, a thermal analysis method according to the present disclosure is carried out using a thermal analysis device that comprises:

two beams extending in the vertical direction, a sample holder assembly detachably attached to the upper ends of the two beams;

a first sample stage and a second sample stage that are detachably attached to the upper ends of the two beams instead of the sample holder assembly;

a heater that heats the sample holder assembly or the first sample stage and the second sample stage;

wherein the sample holder assembly includes a first sample holder for placing a sample and a second sample holder for placing a reference substance; and a heat sink coupled to each of the first sample holder and the second sample holder with a member having a predetermined thermal resistance; and wherein, when the sample holder assembly is mounted on the upper ends of the two beams, the first sample holder and the second sample holder are in contact with the upper ends of the two beams, the method comprising the steps of:

attaching the sample holder assembly to the two beams and measuring a temperature difference between the upper ends of the two beams while changing the temperature of the heater; and mounting the first sample stage and the second sample stage on the two beams and measuring the weight difference between the sample on the first sample stage and the reference substance on the second sample stage while changing the temperature of the heater.

Advantageous Effect

The present disclosure makes it possible to provide a thermal analysis device, a sample holder assembly and a thermal analysis method, capable of TG-DSC measurement while simplifying replacement works when the temperature sensor or the like is damaged.

DETAILED DESCRIPTION

Embodiments of the present disclosure will now be described with reference to the drawings.

Figure 1:
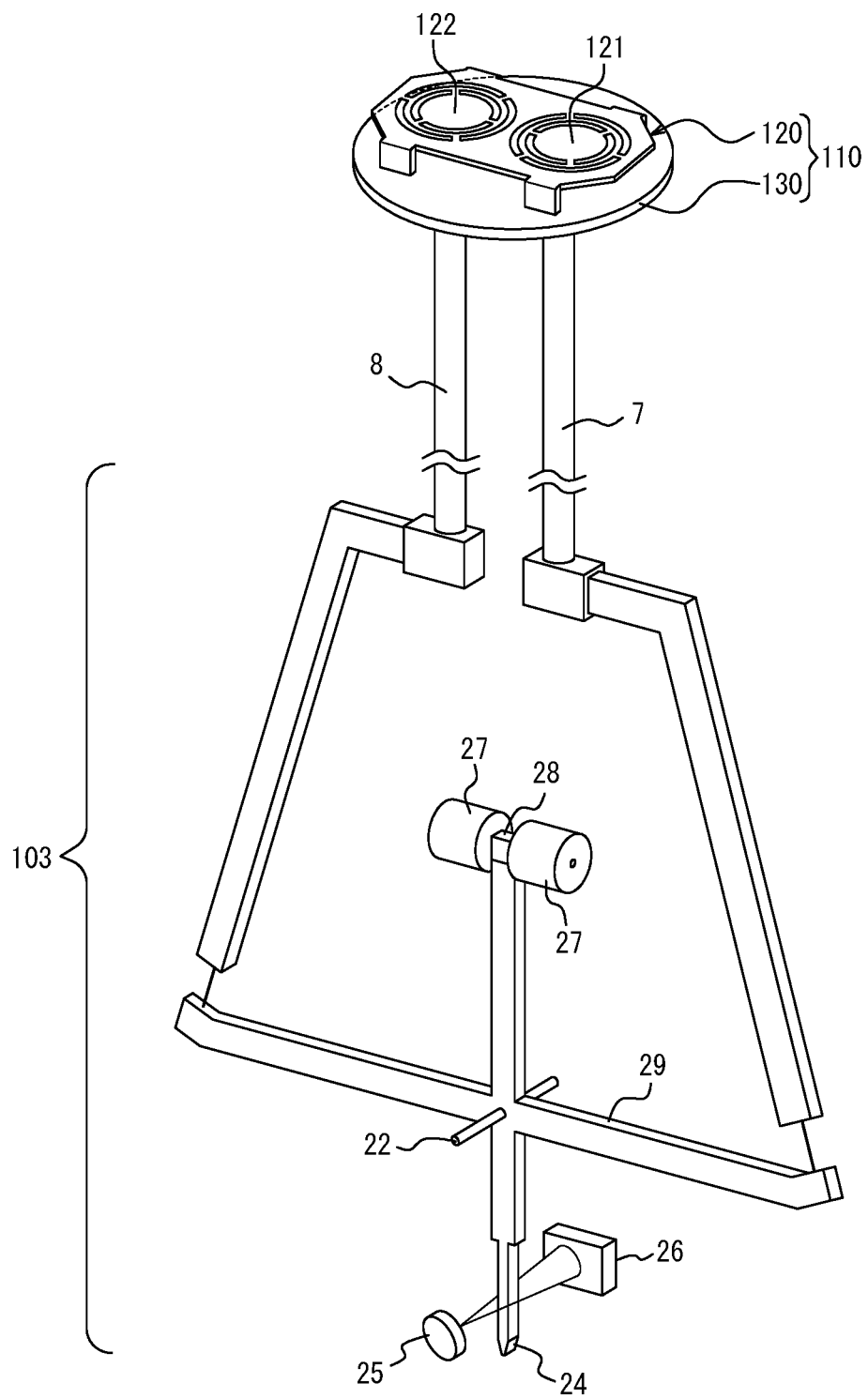
FIG. 1 is a diagram showing the structure (when a sample holder assembly is mounted) of a mechanism part of a thermal analysis device according to an embodiment of the present disclosure.

FIG. 1 is a diagram showing the structure of a mechanism part of a thermal analysis device 100 according to an embodiment of the present disclosure. The thermal analysis device 100 according to the present embodiment includes a sample holder assembly 110 used for differential scanning calorimetry (DSC), a first sample stage 221 a second sample stage 222 (see FIGS. 5A and 5B) that are mounted in place of the sample holder assembly 110 and used for thermogravimetry (TG), beams 7 and 8 that support the sample holder assembly 110, or the first sample stage 221 and the second sample stage 222, and a balance 103 that measures the weight difference between the sample and the reference substance. The thermal analysis device 100 further includes a heating furnace 20, a balance controller 200, a temperature measurement section 300 and a temperature controller 400, which will be described later.

First, the sample holder assembly 110 will be described.

Figure 2A:
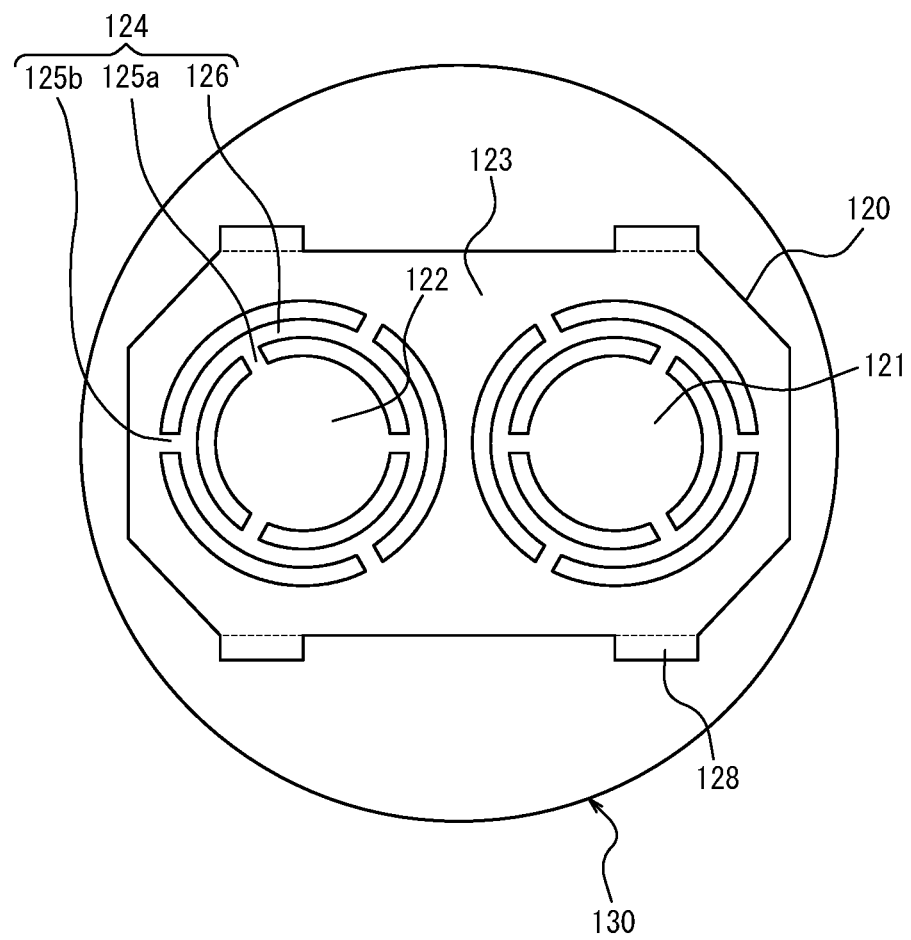
FIG. 2A is a plan view of a sample holder assembly forming part of a thermal analysis device according to an embodiment of the present disclosure.
Figure 2B:
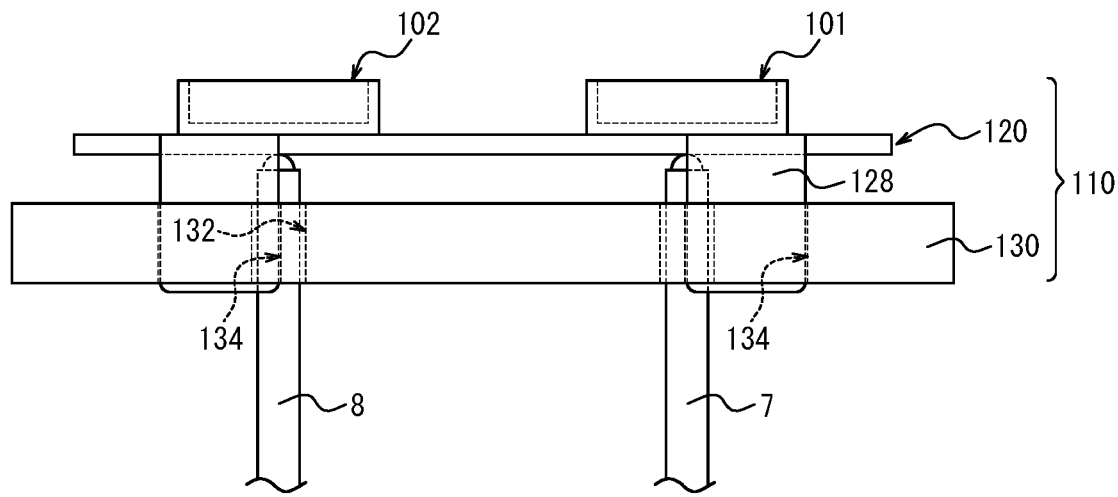
FIG. 2B is a front view of a sample holder assembly forming part of a thermal analysis device according to an embodiment of the present disclosure.
Figure 2C:
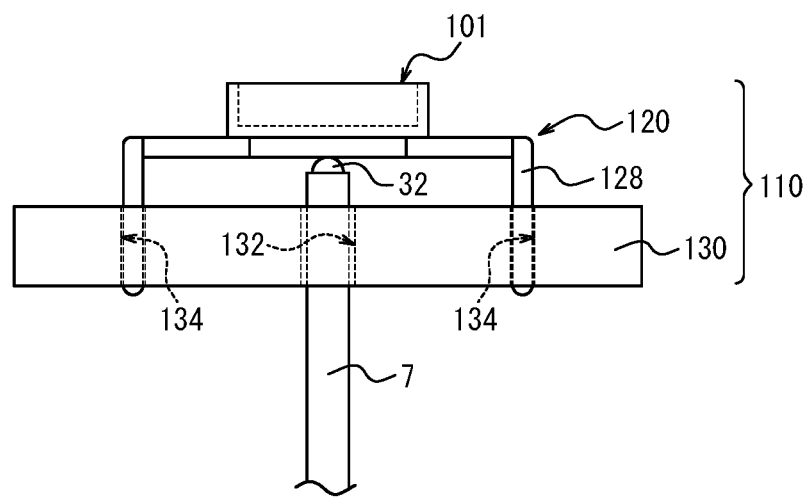
FIG. 2C is a side view of a sample holder assembly forming part of a thermal analysis device according to an embodiment of the present disclosure.

FIGS. 2A to 2C are views showing a sample holder assembly 110 that constitutes the thermal analysis device 100 of the present embodiment. The sample holder assembly 110 includes a sample container 101 for placing a sample, a reference substance container 102 for placing a reference substance, a sample stage 120 comprising a first sample holder 121 for placing the sample container 101 and a second sample holder 122 for placing the reference substance container 102, and a substrate 130 for supporting the sample stage 120 on the upper ends of the beams 7 and 8.

The sample container 101 and the reference substance container 102 have a bottomed cylindrical shape, as shown in FIGS. 2B to 2C, and are respectively provided on the first sample holder 121 and the second sample holder 122 provided on the sample stage 120. In FIGS. 1 and 2A, the sample container 101 and the reference substance container 102 are not shown. The first sample holder 121 and the second sample holder 122 need only be able to securely place the sample container 101 and the reference substance container 102 and are connected to the heat sink 123 with an appropriate thermal resistance. The outer diameters of the first sample holder 121 and the second sample holder 122 are preferably larger than or equal to the outer diameters of the sample container 101 and the reference substance container 102. For example, the outer diameters of the first sample holder 121 and the second sample holder 122, and the sample container 101 and the reference substance container 102 can all be φ5.2 mm. The material of the sample container 101 and the reference substance container 102 takes into consideration the measurement temperature condition and the like, and may be, for example, alumina, platinum, platinum rhodium alloy, quartz glass, aluminum, magnesia (MgO), yttria ($Y_2O_3$), gold (Au), silver (Ag), graphite, boron nitride (BN), molybdenum (MO), or zirconia ($ZrO_2$). It is preferred that the sample container 101 and the reference substance container 102 have the same shape and are formed of the same material.

As shown in FIGS. 2A to 2C, the sample stage 120 includes a first sample holder 121 and a second sample holder 122 having a substantially circular shape in the plan view on which the sample container 101 and the reference substance container 102 are respectively mounted, a heat sink 123 surrounding the first sample holder 121 and the second sample holder 122 from the outside in the radial direction in the plan view, an arm portion 124 for connecting the first sample holder 121 and the second sample holder 122 and the heat sink 123 with a predetermined thermal resistance, and a leg portions 128 for fixing the sample stage 120 to the substrate 130. In FIG. 2A, the sample container 101 and the reference substance container 102 are not shown.

The first sample holder 121 and the second sample holder 122 are arranged side by side on the same plane in the sample stage 120, and when the sample holder assembly 110 is mounted on the upper ends of the beams 7 and 8, as shown in FIG. 2A-2C, the lower surfaces of the first sample holder 121 and the second sample holder 122 are in contact with the upper ends of the beams 7 and 8, respectively. The first sample holder 121 and the second sample holder 122 are surrounded by a heat sink 123 from the outside in the radial direction in the plan view, and the first sample holder 121 and the second sample holder 122 are connected to the heat sink 123 by an arm portion 124 having a predetermined thermal resistance.

The arm portion 124 comprises a radially inner arm portion 125a extending radially outward from the first sample holder 121 and the second sample holder 122, a circumferential arm portion 126 connected to the outer end portion of the radially inner arm portion 125a and extending in the circumferential direction and a radially outer arm portion 125b that connects the circumferential arm portion 126 and the heat sink 123 and extends in the radial direction. With such a configuration, heat from the sample and the reference substance can be transmitted to the heat sink 123 without being biased in the circumferential direction as much as possible.

As shown in FIG. 2A, the radially outer arm portion 125b is provided at a circumferential position between one radially inner arm portion 125a and another radially inner arm portion 125a. With such a configuration, the heat conduction path length from the first sample holder 121 or the second sample holder 122 to the heat sink 123 through the radially inner arm portion 125a, the circumferential arm portion 126, and the radially outer arm portion 125b is increased. Therefore, the thermal resistance of the arm portion 124 can be increased in a limited space. The thermal resistance of the arm portion 124 serves to determine the thermal resistance R in Equation (3).

In the present embodiment, the sample container 101 and the reference substance container 102 are formed to be substantially circular in the plan view, and the first sample holder 121, the second sample holder 122 and the arm portion 124 are concentric in accordance therewith. However, the present disclosure is not limited to this configuration. The sample container 101 and the reference substance container 102 may be configured to have, for example, a rectangular shape in the plan view.

As shown in FIG. 2A, the sample stage 120 has a rectangular outer shape with chamfered corner portion in the plan view, and leg portions 128 for fixing to the substrate 130 are provided at four locations on the outer peripheral portion. The leg portions 128 hang down from the outer periphery of the heat sink 123, with their lower ends passed through four slits 134 in the substrate 130 (see FIGS. 2B and 2C). The leg portions 128 which penetrated the slits 134 are fixed with the ceramic-based adhesive agent in the lower surface of the substrate 130. Instead of the above-described embodiment, the leg portions 128 hanging down from the outer peripheral portion of the heat sink 123 may have an L-shape that is bent along the substrate 130 at the lower end thereof and the leg portions 128 may be bonded to the upper surface of the substrate 130 in order to fix the sample stage 120 to the substrate 130.

In the present embodiment, it is preferred that the sample stage 120 is symmetrical as shown in FIGS. 2A and 2B. With such a configuration, the thermal resistance and heat capacity from the sample holder to the heat sink 123 on the sample side and the reference substance side can be made substantially equal. The material of the sample stage 120 may, for example, be platinum (Pt) or platinum rhodium alloy (PtRh). However, the present disclosure is not limited to this embodiment, and other metals may be used.

The substrate 130 in the present embodiment has a substantially disk shape and has an upper surface on which the sample stage 120 is fixed. The substrate 130 includes two through-holes 132, and the two beams 7 and 8 pass through the through-holes 132 and is brought into contact with the lower surfaces of the first sample holder 121 and the second sample holder 122 in the sample stage 120. As will be described later, the upper ends of the two beams 7 and 8 serve as temperature measuring contacts 32 and 35 (see FIG. 3) of the thermocouple. By contacting the upper ends of the two beams 7 and 8 with the lower surfaces of the first sample holder 121 and the second sample holder 122, it is possible to measure, by means of the thermocouple, the temperature and the temperature difference between the sample and reference substance in the sample container 101 and the reference substance container 102 placed on the first sample holder 121 and the second sample holder 122. As the material of the substrate 130, for example, alumina or the like may be used.

As described above, the sample holder assembly 110 according to this embodiment has a configuration wherein the sample stage 120 is fixed on the substrate 130 having the two through holes 132 for passing the beams 7 and 8 therethrough, and the two beams 7 and 8 are brought into contact with the first sample holder 121 and the second sample holder 122 on the back surface of the sample stage 120 so that the sample holder assembly 110 is attached to the upper ends of the two beams 7 and 8 passed through the through-holes 132. Accordingly, the sample holder assembly 110 can be easily removed from the beams 7 and 8 by lifting the sample holder assembly 110 upward and removing the beams 7 and 8 from the through-holes 132. Therefore, for example, even when boiling over of the sample in the sample container 101 takes place by the heating and the sample stage 120 or the thermocouple needs to be replaced, this can be dealt with in a facilitated manner through replacement by lifting the sample holder assembly 110 attached to the upper ends of the beams 7 and 8. In addition, the sample holder assembly 110 can be easily replaced with a first sample stage 221 and a second sample stage 222 to be described later. Therefore, after performing DSC using the sample holder assembly 110, the sample holder assembly 110 can be easily replaced with the first sample stage 221 and the second sample stage 222 so that TG or TG-DTA can be performed.

Figure 3:
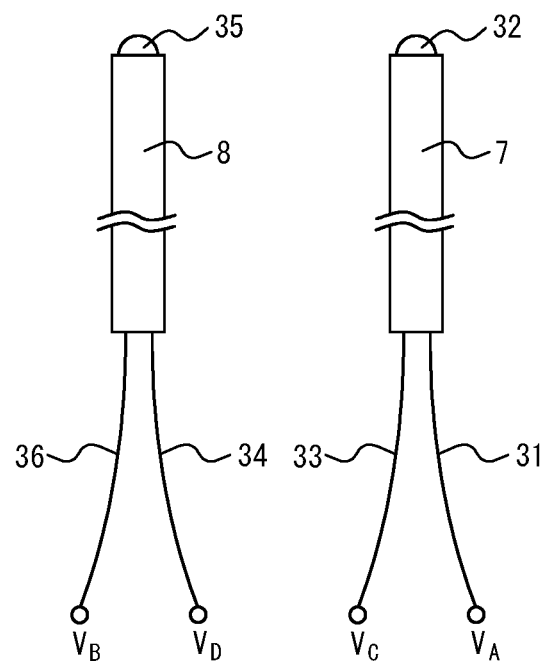
FIG. 3 is a front view showing a configuration of a beam and a thermocouple forming part of a thermal analysis device according to an embodiment of the present disclosure.

As shown in FIG. 1, the two beams 7 and 8 comprise members having a rod-like outer shape and heat resistance. The beams 7 and 8 extend upward from the balance 103, and each constitutes a two-core insulating tube having two insulating holes. For example, alumina may be used as the material of the beams 7 and 8. In the beam 7, as shown in FIG. 3, a thermocouple wire A31 and a thermocouple wire B33 extend downward from the temperature measuring contact 32 beyond the lower end of the beam 7. Similarly, in the beam 8, a thermocouple wire A36 and a thermocouple wire B34 extend downward from the temperature measuring contact 35 beyond the lower end of the beam 8. The temperature measuring contact 32 connects, for example, the upper ends of the thermocouple wire A31 and the thermocouple wire B33 by welding, and is configured so that the connecting part can be connected in electrically conductive manner with the lower surface of the first sample holder 121 or the first sample stage 221 of the sample stage 120 described above. In the temperature measuring contact 35, similarly, the upper ends of the thermocouple wire A36 and the thermocouple wire B34 are connected by welding.

In this manner, the two beams 7 and 8 are arranged to extend in the vertical direction, for allowing placement of the sample and the like on the differential balance 103, and serve to pass, through the insulation holes, the thermocouple wires for measuring the temperature and the temperature difference of the sample and the like.

In the present embodiment, for example, the material of the thermocouple wire A31 and the thermocouple wire A36 may be platinum rhodium alloy (PtRh), and the material of the thermocouple wire B33 may be platinum (Pt). In this case, by using platinum (Pt) as the material of the arm portion 124 and the heat sink 123 of the sample stage 120, the first sample holder 121 and the second sample holder 122 are electrically coupled by platinum (Pt). By configuring with these materials, the connection between the thermocouple wire A31 and the thermocouple wire A36 forms a PtRh-Pt-PtRh junction. With this configuration, it is possible to measure the temperature difference between one PtRh-Pt junction and the other PtRh-Pt junction. This temperature difference is the temperature difference between the first sample holder 121 and the second sample holder 122. The thermocouple comprising platinum and a platinum rhodium alloy has a feature that a high temperature measurement at 1500° C. or higher is possible although the thermoelectromotive force change with respect to the temperature change, i.e., the Seebeck coefficient is small.

Further, in the PtRh-Pt-PtRh junction described above, the temperature difference between one PtRh-Pt junction and the other PtRh-Pt junction can be measured as the potential difference ($V_A$-$V_B$) between the thermocouple wire A31 and the thermocouple wire A36 in FIG. 3.

In this embodiment, the sample container 101 and the reference substance container 102 are directly placed on the first sample holder 121 and the second sample holder 122. Therefore, it can be considered that the temperature difference between the sample in the sample container 101 and the reference substance in the reference substance container 102 is close to the temperature difference between the first sample holder 121 and the second sample holder 122 as measured by the PtRh-Pt-PtRh junction described above.

In FIG. 3, the thermocouple wire A31 and the thermocouple wire B33 form a PtRh-Pt junction at the temperature measuring contact 32, that is, at the upper end of the beam 7 in the vicinity of the back surface of the first sample holder 121. Therefore, the temperature of the first sample holder 121 can be measured by measuring the potential difference ($V_A$-$V_C$) between the thermocouple wire A31 and the thermocouple wire B33 and correcting the potential difference with an appropriate cold junction circuit (not shown). Further, it can be considered that the temperature of the sample in the sample container 101 is close to the temperature of the first sample holder 121.

The material of the thermocouple wire A31 and the thermocouple wire A36 may be platinum (Pt), and the material of the thermocouple wire B33 may be platinum rhodium alloy (PtRh). In this case, platinum rhodium alloy (PtRh) is used as the material of the arm portion 124 and the heat sink 123 of the sample stage 120. That is, the thermocouple wire A and the thermocouple wire B constitute a thermocouple, and the material of the arm portion 124 and the heat sink 123 is the same as that of the thermocouple wire B.

Figure 4:
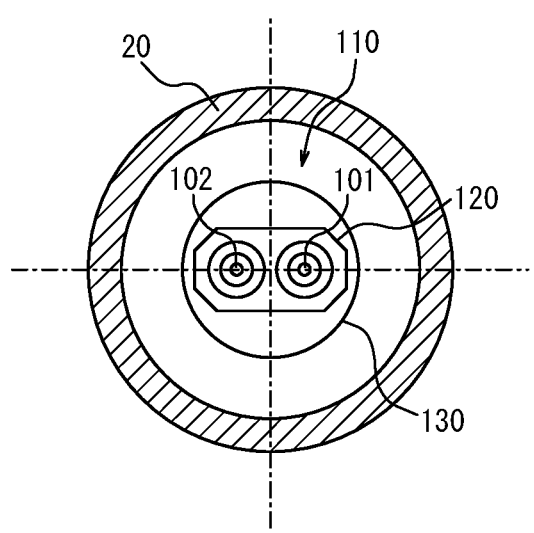
FIG. 4 is a partially sectioned plan view showing a state in which a sample holder assembly forming part of a thermal analysis device according to an embodiment of the present disclosure is arranged in a heating furnace.

FIG. 4 is a plan view showing the sample holder assembly 110 and the heating furnace 20. It is preferred that the heating furnace 20 has, for example, a cylindrical shape, and the sample container 101 and the reference substance container 102 are arranged at positions symmetrical with respect to the center axis of the heating furnace 20. Thereby, the sample container 101 and the reference substance container 102 can be arranged at an equal distance from the center axis of the heating furnace 20.

Next, a description will be given of the first sample stage 221 and the second sample stage 222 mounted, respectively, on the upper ends of the two beams 7 and 8 in place of the sample holder assembly 110. In the present embodiment, as shown in FIGS. 5A and 5B, the first sample stage 221 and the second sample stage 222 are sample stages, on which a sample container 201 and a reference substance container 202 storing a sample and a reference substance, respectively, are placed during thermogravimetry (TG) or TG-DTA.

Figure 5A:
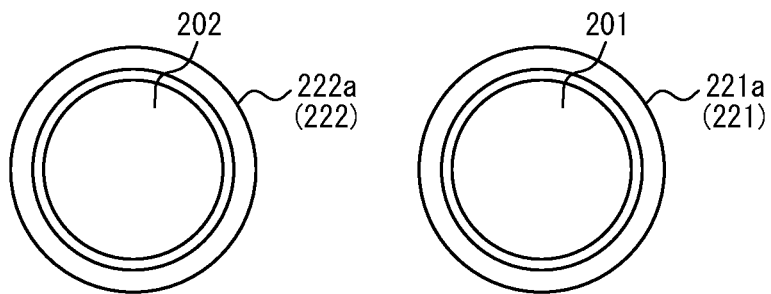
FIG. 5A is a plan view of a first sample stage and a second sample stage forming part of a thermal analysis device according to an embodiment of the present disclosure.
Figure 5B:
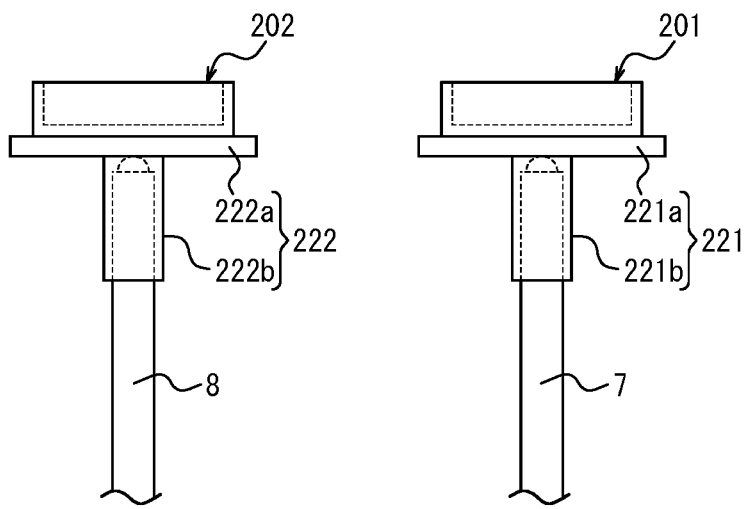
FIG. 5B is a front view of a first sample stage and a second sample stage forming part of a thermal analysis device according to an embodiment of the present disclosure.

As shown in FIGS. 5A and 5B, the sample container 201 and the reference substance container 202 have a bottomed cylindrical shape and are of the same shape and the same material in this embodiment. In the present embodiment, the sample container 201 and the reference substance container 202 are placed on the first sample stage 221 and the second sample stage 222. It is preferred that the material of the sample container 201 and the reference substance container 202 is the same as that of the sample container 101 and the reference substance container 102 in the sample holder assembly 110.

The first sample stage 221 and the second sample stage 222 are provided with substantially disc-shaped flange portions 221a, 222a, and mounting cylinder portions 221b, 222b below the flange portions 221a and 222a, respectively. When the first sample stage 221 and the second sample stage 222 are attached to the two beams 7, 8, as shown in FIG. 5B, the two beams 7, 8 pass through the mounting cylinder portions 221b, 222b, so that the upper ends of the beam 7, 8 are brought into contact with the lower surfaces of the flange portions 221a, 222a. With this configuration, the temperature and temperature difference of the sample and reference substance in the sample container 201 and the reference substance container 202 placed on the first sample stage 221 and the second sample stage 222 can be measured by the temperature measuring contacts 32, 35 of the thermocouple provided at the upper ends of the two beams 7 and 8. As the material for the first sample stage 221 and the second sample stage 222, for example, alumina or the like may be used.

The first sample stage 221 and the second sample stage 222 can be also pulled upward from the state of FIGS. 5A and 5B, to release the engagement between the upper end portions of the beams 7, 8 and the mounting cylinder portions 221b, 222b. By this, the first sample stage 221 and the second sample stage 222 can be easily detached from the beams 7 and 8. Therefore, even when the sample in the sample container 201 boils out by the heating in TG or TG-DTA and the first sample stage 221 or the thermocouple needs to be replaced, the first sample stage 221 mounted on the upper ends of the beams 7, 8 is lifted to deal with this and allow an easy replacement. In addition, replacement can be easily carried out from the first sample stage 221 and the second sample stage 222 to the sample holder assembly 110. Therefore, after performing TG or TG-DTA using the first sample stage 221 and the second sample stage 222, it is possible to easily replace to the sample holder assembly 110 and perform DSC.

In this embodiment, since the sample container 201 and the reference substance container 202 are directly mounted on the first sample stage 221 and the second sample stage 222, it is considered that the temperature difference between the sample in the sample container 201 and the reference substance in the reference substance container 202 is close to the temperature difference between the first sample stage 221 and the second sample stage 222.

It is preferred that the sample container 201 and the reference substance container 202 are also arranged at symmetrical positions with respect to the center axis of the heating furnace 20 shown in FIG. 4. By this, the sample container 201 and the reference substance container 202 can be arranged at an equal distance from the center axis of the heating furnace 20.

Next, the balance 103 is described.

The balance 103 is operated in a state where the sample holder assembly 110 in FIG. 1 is replaced with the sample container 201 and the first sample stage 221, and the reference substance container 202 and the second sample stage 222 shown in FIGS. 5A and 5B. That is, the balance lever 29 is adapted to swing around the main shaft 22 in accordance with the weight difference between the sample placed on the sample container 201 on the first sample stage 221 mounted on the upper end of the beam 7, and the reference substance on the reference substance container 202 on the second sample stage 222 mounted on the upper end of the beam 8. In the present embodiment, the balance 103 constitutes an electromagnetic electronic balance. The balance 103 serves to detect the positional deviation of a shutter 24 when the balance rod 29 swings, with a light emitting element 25 and a light receiving element 26. Here, the light emitting element 25 may, for example, be a light emitting diode element that emits infrared light. Further, the light receiving element 26 may, for example, be an element in which two phototransistors are arranged side by side in the displacement direction of the shutter 24. The balance controller 200 applies a driving force to a magnet 28 connected to the balance lever 29 by causing a current corresponding to the amount of displacement of the shutter 24 as detected by the light receiving element 26 to flow through the driving coil 27, so as to carry out control such that the shutter 24 is always in a predetermined position.

Figure 6:
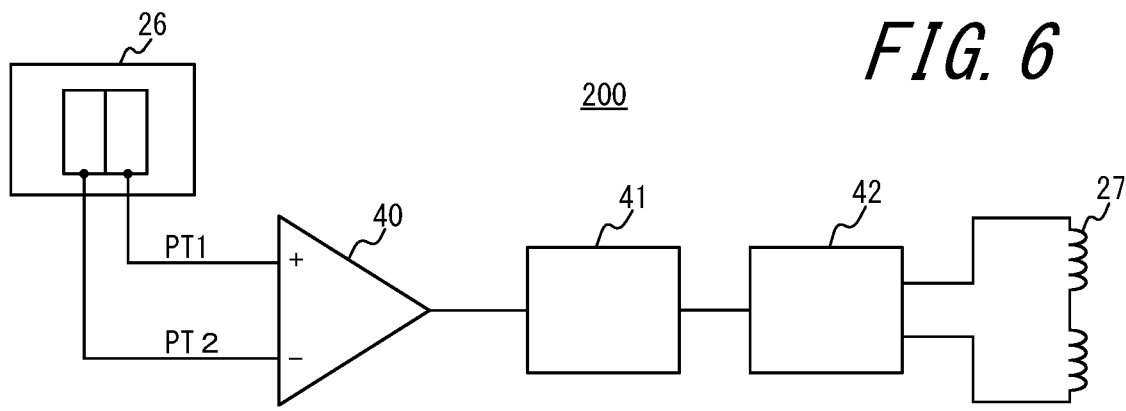
FIG. 6 is a block diagram of a balance controller forming part of a thermal analysis device according to an embodiment of the present disclosure.

FIG. 6 is a block diagram showing the configuration of the balance controller 200. Detection signals PT1, PT2 from the light receiving device 26 are input to a differential amplifier 40. A differential output (PT1-PT2) from the differential amplifier 40 is phase compensated by a phase compensator 41 and then converted into a current signal in a current driver 42 to be supplied to the driving coil 27.

The balance 103 detects a low frequency component of the current signal supplied to the driving coil 27 by the balance controller 200 as the weight difference between a sample and a reference substance.

As mentioned above, since the sample container 201 and the reference substance container 202 are placed at axially symmetric positions in the cylindrical heating furnace 20, the effects of the buoyancy and convection flows caused due to heating on gravity measurement can be canceled.

Next, the temperature measurement section 300 is described.

Figure 7:
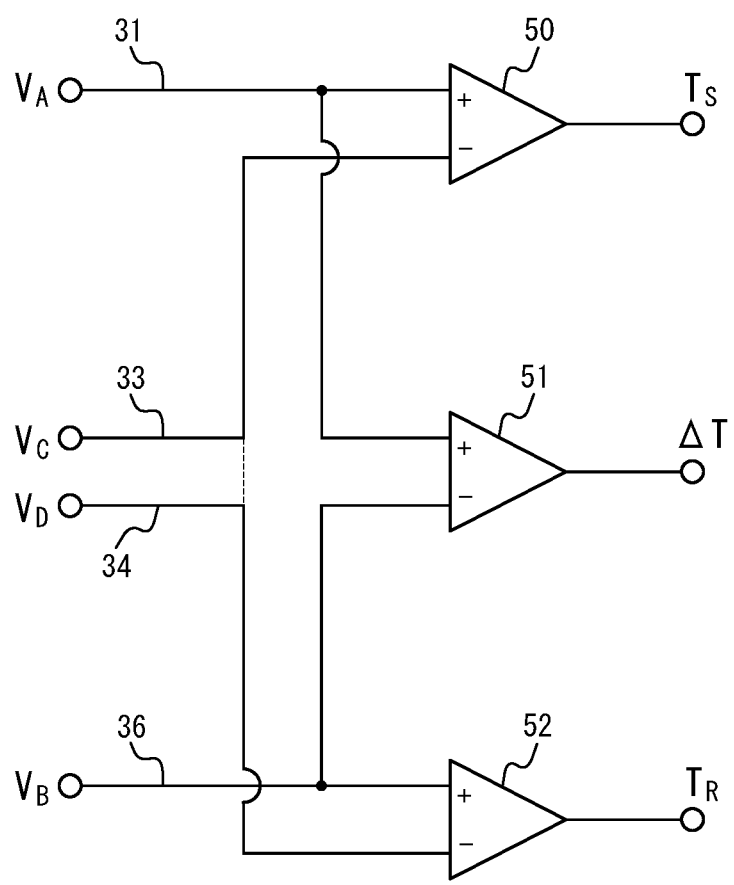
FIG. 7 is a configuration diagram of a temperature measurement section forming part of a thermal analysis device according to an embodiment of the present disclosure.
Figure 8:
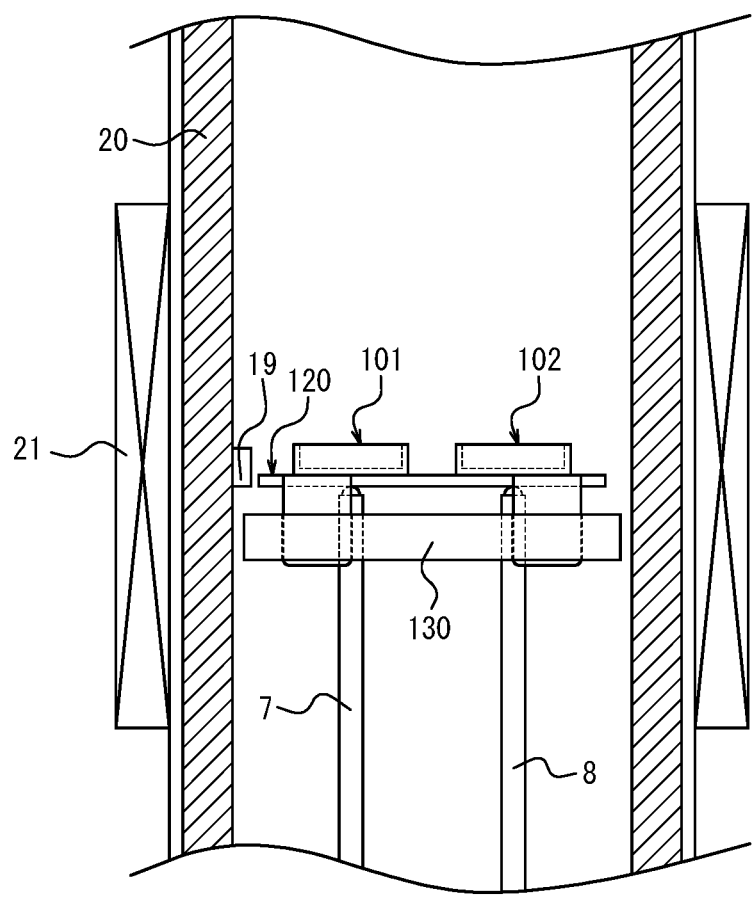
FIG. 8 is a front sectional view showing a sample holder assembly forming part of a thermal analysis device according to an embodiment of the present disclosure together with a cross section of a heating furnace.

FIG. 7 is a block diagram showing the configuration of the temperature measurement section 300. The voltages $V_A$, $V_B$, $V_C$, $V_D$ of the thermocouple wire A31, the thermocouple wire A36, the thermocouple wire B33 and the thermocouple wire B34 from the two beams 7, 8 are input to the temperature measurement section 300.

In the case of DSC, the first sample holder 121 and the second sample holder 122 are electrically connected by the arm portion 124 so that the connection between the thermocouple wire A31 and the thermocouple wire A36 in the above example constitutes a PtRh-Pt-PtRh junction. The temperature difference between one PtRh-Pt junction (the first sample holder 121) and the other PtRh-Pt junction (the second sample holder 122) in the PtRh-Pt-PtRh junction can be measured by the measurement section 300 in FIG. 7 as the potential difference ($V_A$-$V_B$) between the thermocouple wire A31 and the thermocouple wire A36. By this, the temperature difference between the first sample holder 121 and the second sample holder 122, that is, the temperature difference ΔT between the sample in the sample container 101 and the reference substance in the reference substance container 102 can be directly detected as the output voltage of the differential amplifier 51.

Further, by measuring the potential difference ($V_A$-$V_C$) between the thermocouple wire A31 and the thermocouple wire B33 and correcting it with an appropriate cold junction circuit (not shown), the temperature of the first sample holder 121 can be measured. Here, since the sample container 101 is made of alumina having high thermal conductivity and the sample container 101 is in contact with the upper surface of the first sample holder 121, the measured temperature of the first sample holder 121 can be regarded as the sample temperature $T_S$ of the sample placed on the sample container 101. The temperature measurement section 300 is configured such that the differential amplifier 50 outputs ($V_A$-$V_C$) corresponding to $T_S$. Similarly, the differential amplifier 52 is configured to output ($V_B$-$V_D$) corresponding to $T_R$.

On the other hand, in the case of TG-DTA, the temperature measuring section 300 in FIG. 7 short-circuits the thermocouple wire B33 and the thermocouple wire B34 (shown by a broken line in FIG. 7) (VC=VD is established). The circuit is configured so that (VA-VB) can be directly detected as the difference between the thermoelectromotive force ($V_A$-$V_C$) corresponding to the temperature of the temperature measuring junction 32, that is, the first sample stage 221, and the thermoelectromotive force ($V_B$-$V_D$) corresponding to the temperature of the temperature measuring junction 35, that is, the second sample stage 222. By this, the temperature difference between the first sample stage 221 and the second sample stage 222, that is, the temperature difference ΔT between the sample in the sample container 201 and the reference substance in the reference substance container 202 can be directly detected as the output voltage of the differential amplifier 51.

Regarding the conversion from the output potential difference to temperature, for example, DSC of a material having a known transition temperature may be performed and followed by correction of the temperature conversion value (temperature calibration) based on the output potential difference and the transition temperature of that material.

Next, the structure of the heating furnace 20 is described.

FIG. 7 is a diagram showing the state where the sample holder assembly 110 is incorporated in the heating furnace 20. As mentioned above, the heating furnace 20 has a cylindrical shape, and the heating coil 21 is helically wound around the heating furnace 20. The heating coil 21 is wound up and down for the same distance from the height position of the first sample holder 121, the second sample holder 122 and the heat sinks 123 on the sample stage 120. With this configuration, a temperature distribution is formed such that the temperature in the heating furnace 20 is highest at the height positions of the first sample holder 121, the second sample holder 122, and the heat sink 123. Further, in the radial direction, the first sample holder 121 and the second sample holder 122 are equidistant from the center axis of the heating furnace 20, and are therefore equidistant from the cylindrical wall surface of the heating furnace 20. Therefore, the first sample holder 121 and the second sample holder 122 are equally heated by the heating furnace 20. A furnace temperature sensor 19 for measuring the temperature of the heating furnace 20 is installed at the height position of the first sample holder 121 and the second sample holder 122 on the inner surface of the heating furnace 20. For the furnace temperature sensor 19, for example, a thermocouple having a PtRh-Pt junction may be used.

Note that a platinum alloy, for example, may be used as the material of the heating coil 21 in consideration of the measurement temperature range and the like.

Figure 9:
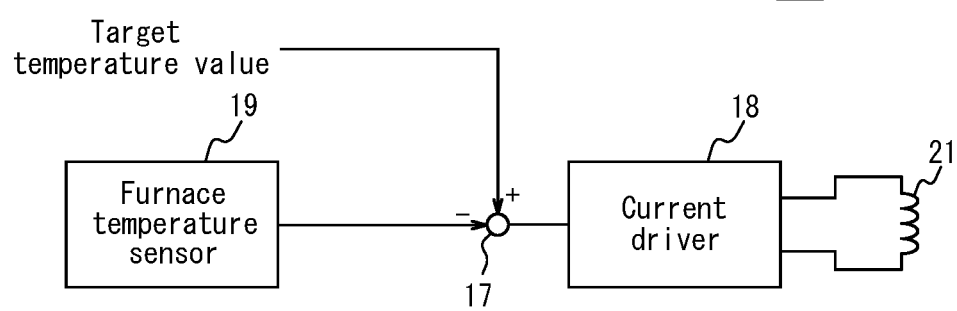
FIG. 9 is a block diagram of a temperature controller that performs temperature control of a heating furnace forming part of a thermal analysis device according to an embodiment of the present disclosure.

The temperature in the heating furnace 20 is controlled by a temperature controller 400 shown in FIG. 9. The temperature controller 400 drives the current driver 18 based on the difference between the target temperature value and the furnace temperature from the furnace temperature sensor 19 calculated by the comparator 17 and supplies current to the heating coil 21. Furthermore, the temperature in the heating furnace 20 may be controlled by inputting the sample temperature $T_S$ or the reference substance temperature $T_R$ instead of the furnace temperature from the furnace temperature sensor 19.

Figure 10:
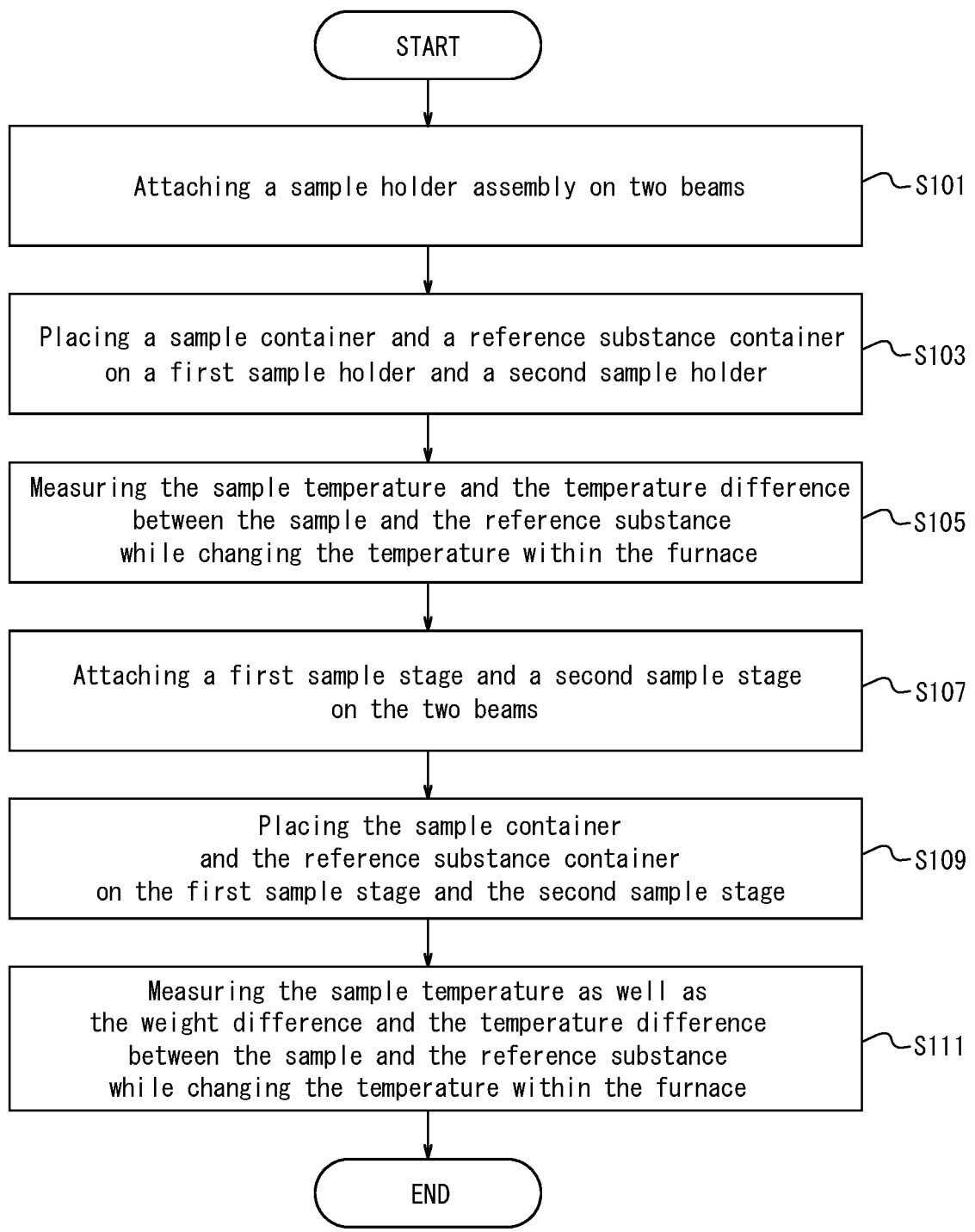
FIG. 10 is a flowchart showing a procedure for performing a thermal analysis method according to an embodiment of the present disclosure.
Figure 11:
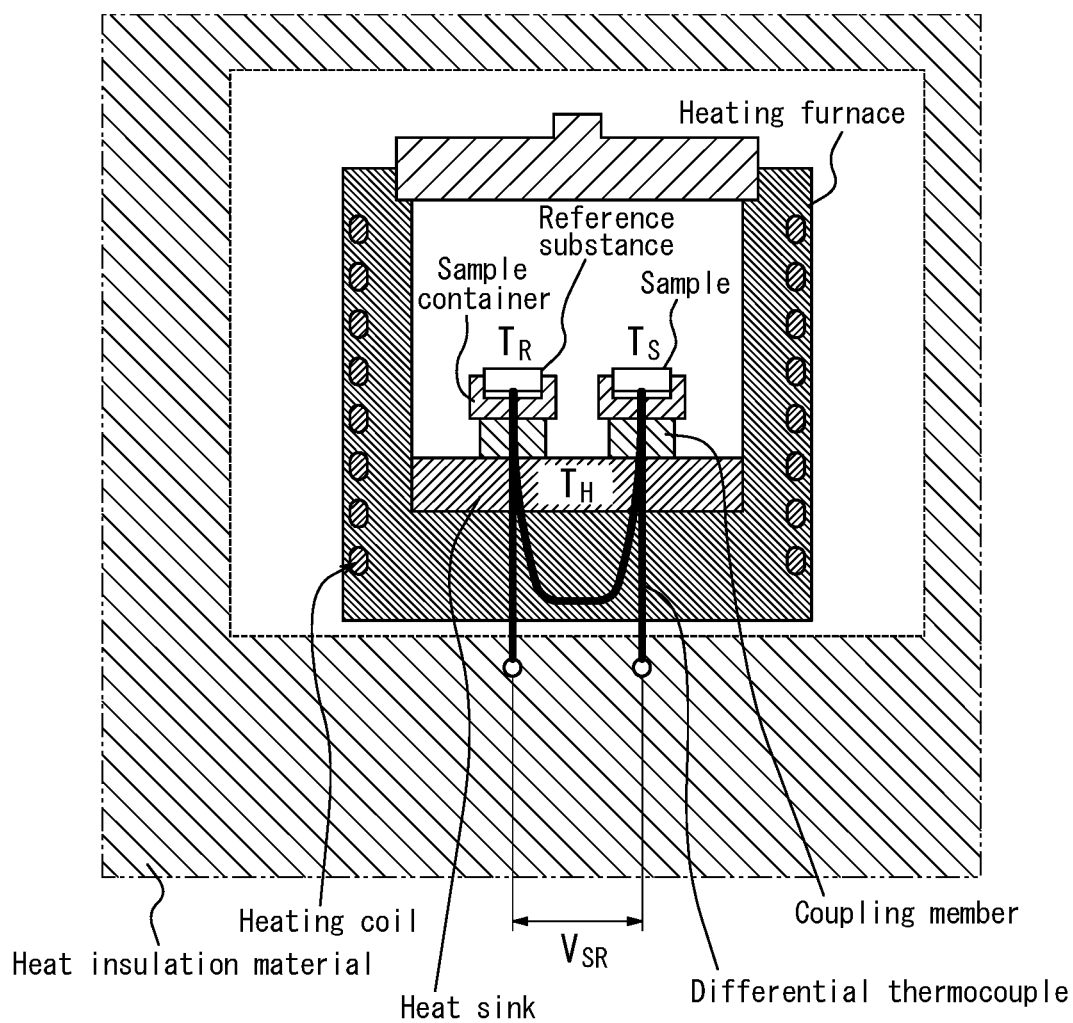
FIG. 11 is a diagram showing a constitution example of a conventional DSC.
Figure 12A:
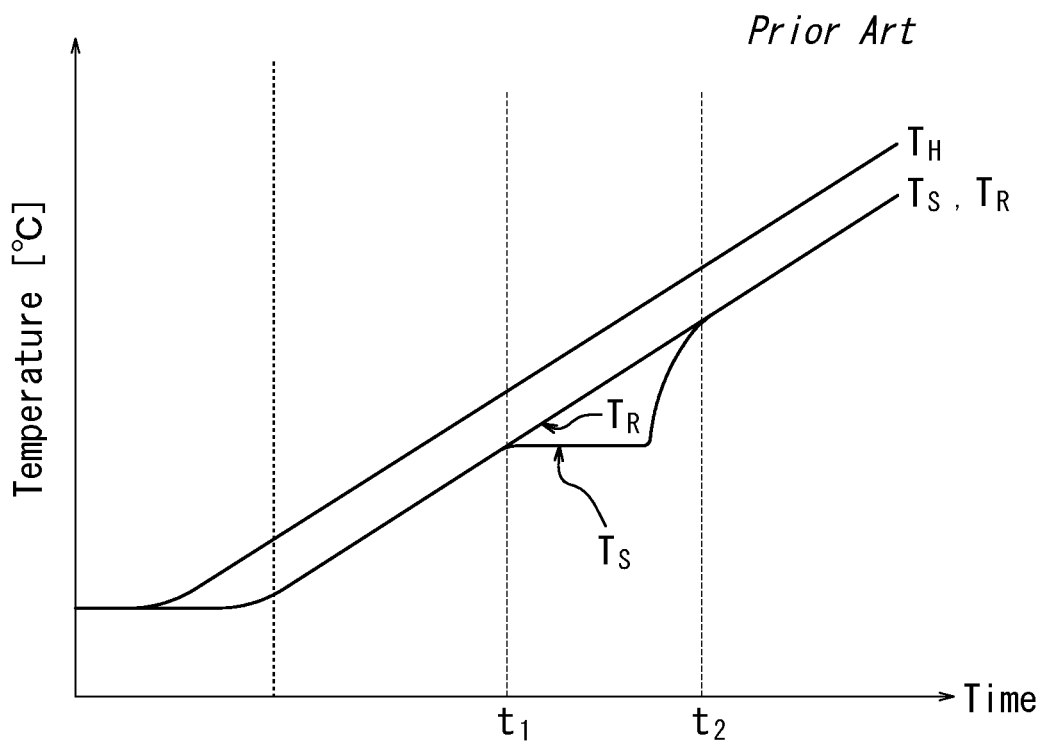
FIG. 12A is a diagram showing the relationship between time and sample temperature $T_S$, reference substance temperature $T_R$, and heat sink temperature $T_H$ obtained by conventional DSC.
Figure 12B:
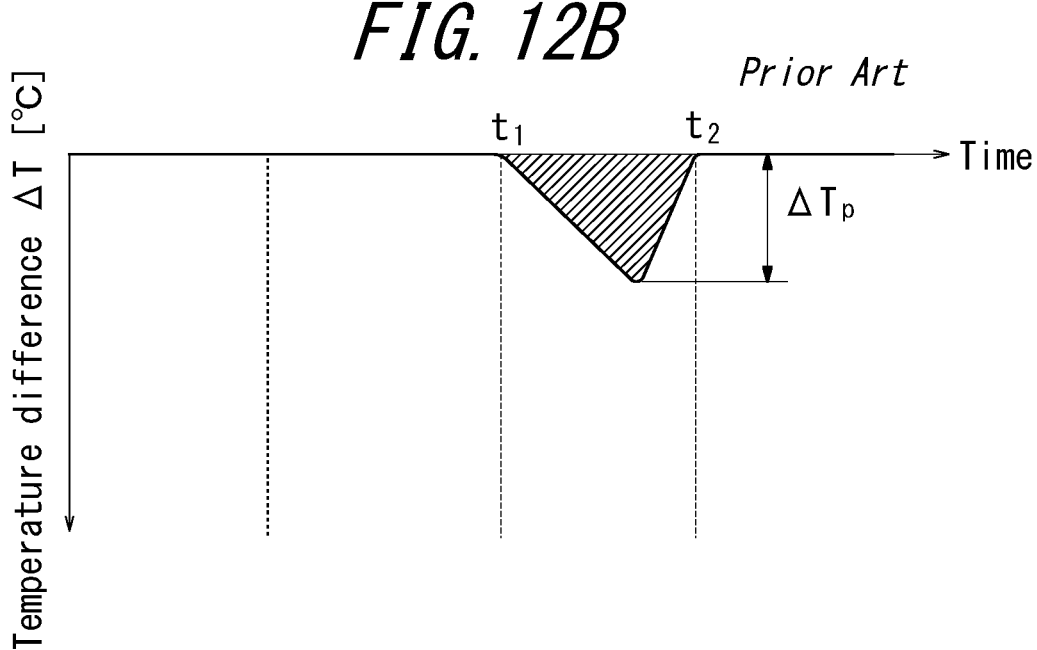
FIG. 12B is a diagram showing the relationship between time and temperature difference $\Delta T$ obtained by conventional DSC.

Next, a thermal analysis procedure using the thermal analysis device 100 according to the present embodiment is described with reference to FIG. 10 and the like.

(Dsc Procedure)

First, the sample holder assembly 110 is mounted on the upper ends of the beams 7, 8 erected on the balance 103 (step S101), with the first sample holder 121 and the second sample holder 122 connected to the heat sink 123, as shown in FIG. 1 to FIG. 2C, to form the structure for DSC. On this occasion, the balance 103 is locked so that the beams 7 and 8 do not move relatively in the vertical direction. Next, the sample container 101 containing the sample and the reference substance container 102 containing the reference substance are placed on the first sample holder 121 and the second sample holder 122 in the sample holder assembly 110 (step S103).

When preparation for the DSC is completed by executing step S103, the temperature controller 400 changes the target temperature value to change the temperature in the heating furnace 20. Then, the temperature difference $\Delta T$ between the sample and the reference substance is measured together with the sample temperature $T_S$ (step S105). The sample temperature $T_S$ can be calculated from the thermoelectromotive force ($V_A$-$V_C$) in FIGS. 3 and 7, and the temperature difference $\Delta T$ between the sample and the reference substance can be calculated from the thermoelectromotive force ($V_A$-$V_B$). The sample temperature $T_S$ is measured at the upper end of the beam 7, and the temperature difference $\Delta T$ between the sample and the reference substance is measured as the temperature difference at the upper ends of the two beams 7, 8.

The temperature difference $\Delta T$ between the sample and the reference substance can be converted into a heat flow difference $d\Delta q/dt$ between the reference substance and the sample by Equation (3). Here, the thermal resistance R between the sample and the reference substance used in Equation (3) can be calculated in advance using a known substance as described above. In addition, the endothermic amount Q of the sample can be calculated by time integration of the temperature difference $\Delta T$ according to Equation (4).

(Tg-Dta Procedure)

Next, instead of the sample holder assembly 110, the first sample stage 221 and the second sample stage 222 are attached to the upper ends of the beams 7 and 8 that are erected on the balance 103 (step S107). As shown in FIGS. 5A and 5B, the first sample stage 221 and the second sample stage 222 are configured to be movable independently for TG-DTA. Here, the lock of the balance 103 performed at the time of DSC is released. Next, the sample container 201 containing the sample and the reference substance container 202 containing the reference substance are placed on the first sample stage 221 and the second sample stage 222 (step S109).

When preparation for TG-DTA is completed by executing step S109, the temperature controller 400 changes the target temperature value to change the temperature in the heating furnace 20. Then, together with the sample temperature $T_S$, the weight difference between the sample and the reference substance and the temperature difference $\Delta T$ between the sample and the reference substance are measured simultaneously (step S111). The sample temperature $T_S$ can be calculated from the thermoelectromotive force ($V_A$-$V_C$) in FIGS. 3 and 7, and the weight difference between the sample and the reference substance can be calculated from the low frequency component of the current signal supplied to the driving coil 27 in FIG. 6. Further, the temperature difference $\Delta T$ between the sample and the reference substance can be calculated from the thermoelectromotive force ($V_A$-$V_B$). The sample temperature $T_S$ is measured by measuring the temperature at the upper end of the beam 7, and the temperature difference $\Delta T$ between the sample and the reference substance is measured by measuring the temperature difference between the upper ends of the two beams 7, 8.

The thermal analysis is terminated by executing step S111. When performing DSC once again, the process returns to step S101.

In the present embodiment, the heating furnace 20 is configured to have a cylindrical shape in consideration of the ease of winding of the heating coil 21, though the present disclosure is not limited thereto. For example, the heating furnace 20 may have other shapes, such as a quadrangular prism shape.

Moreover, in the present embodiment, platinum and platinum rhodium are used for the material of thermocouple wire A31,36 and thermocouple wire B33,34, the disclosure is not limited to this aspect. The thermocouple wires may be configured using, for example, tungsten and a tungsten rhenium alloy, or iridium and an iridium rhodium alloy.

In the present embodiment, platinum alloy is used as the material of the heating coil 21, though the present disclosure is not limited to this, and other heat-resistant material such as molybdenum or silicon carbide (SiC) may be used.

As described above, the present embodiment comprises: two beams 7, 8 extending in the vertical direction; sample holder assembly 110 that is detachably attached to the upper ends of the two beams 7 and 8; a first sample stage 221 and a second sample stage 222 that are detachably mounted on the upper ends of the two beams 7, 8 in place of the sample holder assembly 110; a heater (heating furnace 20) that heats the sample holder assembly 110, or the first sample stage 221 and the second sample stage 222; a temperature controller 400 that controls the temperature of the heater; a temperature measurement section 300 for detecting the temperature difference between the upper ends of the two beams 7, 8; and a weight measuring section (balance 103) that holds the two beams 7, 8 and measures the weight difference between the sample on the first sample stage 221 and the reference substance on the second sample stage 222; wherein the holder assembly 110 comprises a first sample holder 1 for placing a sample and a second sample holder 122 for placing a reference substance, and a heat sink 123 coupled to each of the first sample holder 121 and the second sample holder 122 by a member having a predetermined thermal resistance; wherein, when sample holder assembly 110 is attached to the upper ends of the two beams 7, 8, the first sample holder 121 and the second sample holder 122 come into contact with the upper ends of the two beams 7, 8; and wherein at least one of the temperature difference and the weight difference is measured while changing the temperature of the heater by the temperature controller 400. By adopting such a configuration, even when the sample boils out during the thermal analysis by heating and the sample stage 120 or the thermocouple needs to be replaced, this can be dealt with by lifting the sample holder assembly 110 attached to the upper ends of the beams 7 and 8 for replacing it easily. In addition, the sample holder assembly 110 can be easily replaced with the first sample stage 221 and the second sample stage 222. Therefore, after performing DSC using the sample holder assembly 110, the sample holder assembly 110 can be easily replaced with the first sample stage 221 and the second sample stage 222 to carry out TG-DTA.

In the present embodiment, the heat sink 123 is arranged so as to surround the first sample holder 121 and the second sample holder 122 in a plan view. By adopting such a configuration, the beams 7 and 8 can be easily brought into contact with the first sample holder 121 and the second sample holder 122 from below, and the heat flow from the first sample holder 121 and the second sample holder 122 to the heat sink 123 can be prevented from being biased in the circumferential direction.

In the present embodiment, the member having a predetermined thermal resistance comprises a radially inner arm portion 125a extending radially outward from the first sample holder 121 and the second sample holder 122, a circumferential arm portion 126 connected to the outer end of the radially inner arm portion 125a and extending in the circumferential direction, and a radially outer arm 125b connecting the circumferential arm portion 126 and the heat sink 123 and extending in the radial direction. By adopting such a configuration, the heat flow from the sample and the reference substance can be transmitted to the heat sink 123 without being biased in the circumferential direction as much as possible.

Further, in the present embodiment, the radially outer arm portion 125b is configured to be arranged at a circumferential position between one radially inner arm portion 125a and the other radially inner arm portion 125a. By adopting such a configuration, the length of the heat conduction path from the first sample holder 121 or the second sample holder 122 to the heat sink 123 through the radially inner arm portion 125a, the circumferential arm portion 126 and the radially outer arm portion 125b can be increased, to thereby increase the thermal resistance of the arm portion 124 in a limited space.

In the present embodiment, the first sample holder 121, the second sample holder 122, and the heat sink 123 are configured to be fixed on the substrate 130 having the through-holes 132 that allow the two beams 7 and 8 to pass therethrough. By adopting such a configuration, the sample holder assembly 110 can be easily attached to the beams 7, 8 by bringing the two beams 7, 8 into contact with the first sample holder 121 and the second sample holder 122 through the through-holes 132.

In the present embodiment, the temperature measurement section 300 includes the first metal thermocouple wires A31 and 36 connected to the upper ends of the two beams 7, 8, respectively, and the second metal thermocouple wire B33 connected to the upper end of one beam 7 of the two beams 7, 8, wherein the arm portion 124 and the heat sink 123 are members comprising the second metal. By adopting such a configuration, a differential thermocouple is constituted by the first metal thermocouple wires A31 and A36, and the second metal arm portion 124 and the heat sink 123 electrically connected therebetween. Therefore, the temperature difference between the upper ends of the two beams 7, 8 can be accurately measured with a simple configuration.

In the present embodiment, the first sample holder 121 and the second sample holder 122 of the sample holder assembly 110 are electrically connected to the temperature measuring contacts 32 and 35. However, the present disclosure is not limited to this aspect. Even when the first sample holder 121 and the second sample holder 122 and the temperature measuring contacts 32 and 35 are not electrically connected, it is sufficient that they are in contact with each other with a low thermal resistance. By short-circuiting the thermocouple wire B33 and the thermocouple wire B34 in FIG. 7, the temperature difference ΔT between the sample and the reference substance can be detected by measuring the thermoelectromotive force between the thermocouple wire A31 and thermocouple wire A36. By adopting such a configuration, the material of the sample stage 120 can be selected independently of the thermocouple wires A31, 36 and the thermocouple wires B33, 34. Accordingly, the arm portion 124 and the heat sink 123 as thermal resistors may be comprised, for example, of alumina or the like, other than metal.

In the present embodiment, since platinum is used as the thermocouple wire A and platinum rhodium is used as the thermocouple wire B, it is possible to carry out TG and DSC up to a sample temperature of 1500° C. or higher.

In the present embodiment, since platinum rhodium is used as the thermocouple wire A and platinum is used as the thermocouple wire B, it is possible to carry out TG and DSC up to a sample temperature of 1500° C. or higher.

In addition, the sample holder assembly 110 according to the present embodiment comprises a first sample holder 121 and the second sample holder 122, a heat sink 123 coupled to each of the first sample holder 121 and the second sample holder 122 by a member having a predetermined thermal resistance, and a substrate 130 for fixing the first sample holder 121, the second sample holder 122 and the heat sink 123, wherein the substrate 130 is formed with through-holes 132 below the first sample holder 121 and the second sample holder 122, respectively. By adopting such a configuration, the sample holder assembly 110 can be easily attached to the beams 7, 8 by bringing the two beams 7, 8 into contact with the first sample holder 121 and the second sample holder 122 through the through-holes 132.

Further, the thermal analysis method according to the present embodiment is carried out with a thermal analysis device 100 comprising: two beams 7 and 8 extending in the vertical direction; a sample holder assembly 110 that is detachably attached to the upper ends of the two beams 7 and 8: a first sample stage 221 and a second sample stage 222 that are detachably attached to the upper ends of the two beams 7 and 8 in place of the holder assembly 110; and a heater (heating furnace 20) that heats the sample holder assembly 110 or the first sample stage 221 and the second sample stage 222, wherein the sample holder assembly 110 includes a first sample holder 121 for placing a sample and a second sample holder 122 for placing a reference substance, and a heat sink 123 coupled to each of the first sample holder 121 and the second sample holder 122 with a member having a predetermined thermal resistance, and wherein, when the sample holder assembly 110 is mounted on the upper ends of the two beams 7 and 8, the first sample holder 121 and the second sample holder 122 are brought in contact with the two beams 7, 8, respectively. The thermal analysis method comprises the step of mounting the sample holder assembly 110 on the two beams 7, 8, measuring the temperature difference between the upper ends of the two beams 7, 8 while changing the temperature of the heater, and the step of mounting the first sample stage 221 and the second sample stage 222 on the two beams 7, 8 and measuring the weight difference between the sample on the first sample stage 221 and the reference substance on the second sample stage 222 while changing the temperature of the heater. By adopting such a configuration, even when the sample boils out during heating and the sample stage 120 or the thermocouple needs to be replaced, it is possible to deal with this by lifting the sample holder assembly 110 attached to the upper ends of the beams 7, 8 for an easy replacement. In addition, the sample holder assembly 110 can be easily replaced with the first sample stage 221 and the second sample stage 222. Therefore, after carrying out DSC using the sample holder assembly 110, the sample holder assembly 110 can be easily replaced with the first sample stage 221 and the second sample stage 222 to carry out TG-DTA.

Although the present disclosure has been described with reference to the drawings and examples, it should be noted that those skilled in the art could easily make various changes or modifications based on the present disclosure. Therefore, it should be noted that these variations or modifications are included in the scope of the present disclosure. For example, the functions included in each component, each step, etc. can be rearranged so long as they are logically compatible, and a plurality of components, steps, etc. can be combined into one or divided.

For example, in the present embodiment, the heat sink 123 is disposed so as to surround the first sample holder 121 and the second sample holder 122 in a plan view, but is not limited to this aspect. For example, the heat sink 123 may be arranged side by side in the horizontal direction with respect to the first sample holder 121 and the second sample holder 122.

In the present embodiment, the member having the predetermined thermal resistance is configured to include the radial inner arm portion 125a, the circumferential arm portion 126, and the radial outer arm portion 125b, but is not limited to this aspect. The member having a predetermined thermal resistance may be configured to adopt another shape for increasing the thermal resistance, or may locally adopt a material having low thermal conductivity for increasing the thermal resistance.

In the present embodiment, the first sample holder 121 and the second sample holder 122, the arm portion 124, and the heat sink 123 are integrally formed, but the present disclosure is not limited to this aspect. At least one of these parts may be formed as a separate part.

In the present embodiment, the first sample holder 121, the second sample holder 122, and the heat sink 123 are configured to be fixed on the substrate 130 having the through-holes 132 that allow the two beams 7, 8 to pass therethrough, but they are not limited to this aspect. For example, the sample holder assembly 110 may be configured to be free of the substrate 130.

What is claimed is:

1. A thermal analysis device, comprising:
   two beams extending in a vertical direction,
   a sample holder assembly detachably attached to upper ends of the two beams;
   a first sample stage and a second sample stage that are detachably attached to the upper ends of the two beams instead of the sample holder assembly;
   a heater that heats the sample holder assembly or the first sample stage and the second sample stage;
   a temperature controller that controls a temperature of the heater;
   a temperature measuring section capable of detecting a temperature difference between the upper ends of the two beams;
   a weight measuring section that holds the two beams and measures a weight difference between a sample on the first sample stage and a reference substance on the second sample stage;
   wherein the sample holder assembly includes:
     a first sample holder for placing a sample and a second sample holder for placing a reference substance; and
     a heat sink coupled to each of the first sample holder and the second sample holder with a member having a predetermined thermal resistance;
   wherein, when the sample holder assembly is mounted on the upper ends of the two beams, the first sample holder and the second sample holder are in contact with the upper ends of the two beams, and
   wherein at least one of the temperature difference and the weight difference is measured while changing the temperature of the heater by the temperature controller.

2. The thermal analysis device according to claim 1, wherein the heat sink is arranged to surround the first sample holder and the second sample holder in a plan view.

3. The thermal analysis device according to claim 1, wherein the first sample holder, the second sample holder and the heat sink are fixed on a substrate having a through-hole through which the two beams pass.

4. The thermal analysis device according to claim 2, wherein the member having the predetermined thermal resistance comprises a radially inner arm portion extending in a radial direction outward from the first sample holder or the second sample holder, a circumferential arm portion extending in a circumferential direction and connected to an outer end portion of the radially inner arm portion, and a radially outer arm portion extending in the radial direction and connecting the circumferential arm portion with the heat sink.

5. The thermal analysis device according to claim 2, wherein the first sample holder, the second sample holder and the heat sink are fixed on a substrate having a through-hole through which the two beams pass.

6. The thermal analysis device according to claim 2, wherein the temperature measuring section includes:
   a thermocouple wire comprising a first metal connected to each of the upper ends of the two beams; and
   a thermocouple wire comprising a second metal connected to the upper end of one of the two beams;
   wherein the member having the predetermined thermal resistance and the heat sink are members made of the second metal.

7. The thermal analysis device according to claim 1, wherein the member having the predetermined thermal resistance comprises a radially inner arm portion extending in a radial direction outward from the first sample holder or the second sample holder, a circumferential arm portion extending in a circumferential direction and connected to an outer end portion of the radially inner arm portion, and a radially outer arm portion extending in the radial direction and connecting the circumferential arm portion with the heat sink.

8. The thermal analysis device according to claim 7, wherein the radially outer arm portion is disposed at a circumferential position between the radially inner arm portion and another radially inner arm portion.

9. The thermal analysis device according to claim 1, wherein the temperature measuring section includes:
   a thermocouple wire comprising a first metal connected to each of the upper ends of the two beams; and
   a thermocouple wire comprising a second metal connected to the upper end of one of the two beams;
   wherein the member having the predetermined thermal resistance and the heat sink are members made of the second metal.

10. The thermal analysis device according to claim 9, wherein the first metal is platinum and the second metal is a platinum rhodium alloy.

11. The thermal analysis device according to claim 9, wherein the first metal is a platinum rhodium alloy and the second metal is platinum.

12. A sample holder assembly comprising:
    a first sample holder and a second sample holder;
    a heat sink coupled to each of the first sample holder and the second sample holder with a member having a predetermined thermal resistance; and a substrate for fixing the first sample holder, the second sample holder and the heat sink;

wherein through-holes are respectively formed below the first sample holder and the second sample holder in the substrate, each through-hole being configured to provide passage for one of two beams connected to a weight measuring section;

wherein the first sample holder and the second sample holder are attachable to the two beams instead of the substrate to measure a weight difference between a sample on the first sample holder and a reference substance on the second sample holder.

13. The sample holder assembly according to claim 12, wherein the member having the predetermined thermal resistance comprises a radially inner arm portion extending in a radial direction outward from the first sample holder or the second sample holder, a circumferential arm portion extending in a circumferential direction and connected to an outer end portion of the radially inner arm portion, and a radially outer arm portion extending in the radial direction and connecting the circumferential arm portion with the heat sink.

14. The sample holder assembly according to claim 13, wherein the radially outer arm portion is disposed at a circumferential position between the radially inner arm portion and another radially inner arm portion.

15. A thermal analysis method to be carried out with a thermal analysis device comprising:
two beams extending in a vertical direction,
a sample holder assembly detachably attached to upper ends of the two beams;
a first sample stage and a second sample stage that are detachably attached to the upper ends of the two beams instead of the sample holder assembly;
a heater that heats the sample holder assembly or the first sample stage and the second sample stage;
wherein the sample holder assembly includes
a first sample holder for placing a sample and a second sample holder for placing a reference substance; and
a heat sink coupled to each of the first sample holder and the second sample holder with a member having a predetermined thermal resistance;
wherein, when the sample holder assembly is mounted on the upper ends of the two beams, the first sample holder and the second sample holder are in contact with the upper ends of the two beams;
the method comprising the steps of:
attaching the sample holder assembly to the two beams and measuring a temperature difference between the upper ends of the two beams while changing a temperature of the heater; and
mounting the first sample stage and the second sample stage on the two beams and measuring a weight difference between the sample on the first sample stage and the reference substance on the second sample stage while changing the temperature of the heater.

* * * * *